Aug. 26, 1941.   W. P. DODGE   2,253,971
FOOD STORAGE RECEPTACLE
Filed March 9, 1940

Inventor:
William P. Dodge,
by Harry E. Dunham
His Attorney.

Patented Aug. 26, 1941

2,253,971

UNITED STATES PATENT OFFICE 2,253,971

FOOD STORAGE RECEPTACLE

William P. Dodge, Erie, Pa., assignor to General Electric Company, a corporation of New York Application March 9, 1940, Serial No. 323,223

9 Claims. (Cl. 62—89)

My invention relates to refrigerator cabinets, and more particularly to receptacles used within refrigerator cabinets for the purpose of maintaining foods, such as butter and the like, at a temperature higher than that within the main portion of the cabinet.

In order that foodstuffs may be properly preserved, it is necessary to maintain the food storage compartments in domestic refrigerators at a temperature much lower than that at which butter spreads easily. When butter is kept in a refrigerated compartment, it is necessary that it be warmed up before it is in condition for serving at the table. Accordingly, it is an object of my invention to provide a food storage receptacle adapted for use within the refrigerated compartment of a refrigerator and maintained at a temperature at which butter and similar foods stored in the receptacle are sufficiently soft for spreading.

Figure 1:
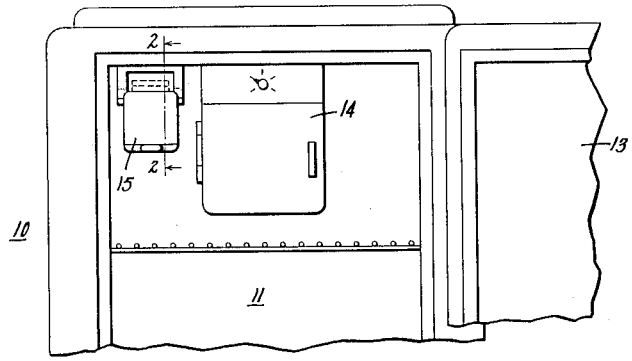
Figure 2:
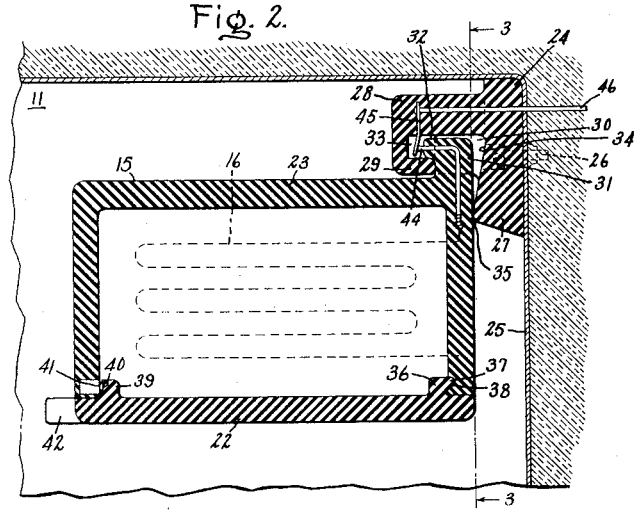
Figure 3:
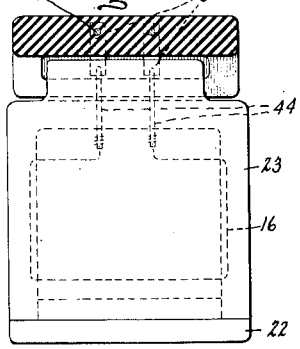
Figure 4:
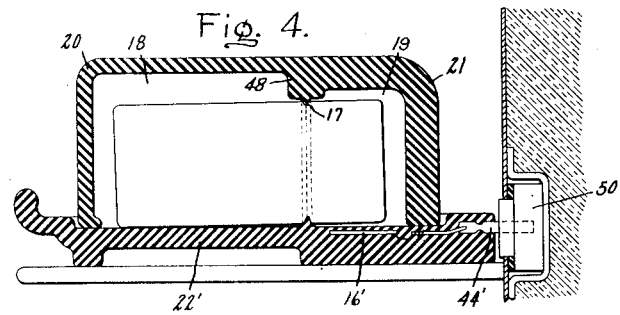

Further objects and advantages of my invention will become apparent from the accompanying drawing taken in connection with the specification, in which Fig. 1 is a partial view of a household refrigerator provided with a receptacle embodying the principles of my invention; Fig. 2 is an enlarged sectional view of the receptacle shown in Fig. 1 taken along the line 2—2 of Fig. 1; Fig. 3 is an end view of the receptacle shown in Fig. 1 partly in cross-section taken along the line 3—3 of Fig. 2, and Fig. 4 is a modification of the receptacle shown in Figs. 1 to 3, inclusive.

I have illustrated a refrigerator 10 of the domestic type having a heat insulated refrigerated compartment 11 therein, the opening in the front wall of the compartment 10 being closed by a heat insulated door 13. In order to cool the compartment 11, an evaporator 14 is arranged in the upper portion of the compartment 11. A food storage receptacle 15 adapted for the storage of butter and the like is illustrated in the upper portion of the compartment 11. In order to maintain the temperature within the receptacle 15 above the temperature prevailing in the compartment 11, I have provided an electric heating coil 16 in the wall of the receptacle 15. In the embodiment of my invention shown in Fig. 4, I have provided a butter receptacle in which the receptacle 15 is formed of a relatively poor heat-conducting material, the inner surface of the receptacle being provided with a rib or seal 17 which engages the butter or like food placed within the receptacle 15, the rib 17 serving to divide the interior of the casing into a low temperature chamber 18 and a high temperature chamber 19. This embodiment requires the use of butter or the like of a size to substantially engage the rib 17, that is, having dimensions substantially the same as, and preferably slightly greater than, the dimensions of the opening defined by the rib 17, as for the reception of the familiar one pound "brick" of butter, for example. The thickness of the wall portions 20 and 21 defining the low and high temperature chambers 18 and 19, respectively, are so proportioned as to permit a greater exchange of heat between chamber 18 and the refrigerated compartment 11 than between the chamber 19 and the compartment 11. With this arrangement the chamber 18 is maintained at a temperature low enough to prevent deterioration of the butter or like food stored therein, whereas the food extending into chamber 19 is maintained at a temperature high enough to be spreadable.

Describing my invention in greater detail with particular reference to Figs. 1 to 3, inclusive, I have disclosed a food storage receptacle 15 formed of a relatively poor heat conducting material as molded plastic for example. The receptacle 15 comprises a food supporting portion 22 and a cover portion 23. The receptacle 15 is supported in the upper rear portion of the compartment 11 by means of a mounting member or bracket 24 suitably secured to the inner shell or liner 25 of the refrigerator 10, as by means of a self-tapping screw 26. The mounting bracket 24 is provided with a downwardly extending leg or portion 27 and a horizontally extending portion 28. The portion 28 is formed with a downwardly and rearwardly or laterally extending lip 29 cooperating with portion 27 to provide a recess 30 for the reception of a mounting projection 31 on the cover portion 23 of the receptacle 15. The mounting projection 31 is provided with a forwardly or laterally extending lip portion 32 overlapping the lip 29 in the assembled position of the device.

In order to permit convenient insertion and removal of the cover portion 23 of the receptacle 15, the leg portion 27 of the mounting bracket 24 is cut back as indicated by the numeral 34, thus leaving a bearing surface 35 at the lower end of the leg portion 27 for engagement with the rear wall of the cover portion 23. It will be seen that the lip portions 29 and 32 and the bearing portion 35 cooperate to hold the receptacle 15 in place. The bearing portion 35 acts as a fulcrum about which the receptacle 15 tends to turn in a counterclockwise direction by reason of its own weight. The resultant force maintains the lip 32 within the portion 33 of recess 30. In order to remove the cover member 23, the cover member must be rotated in a clockwise direction until the lip 32 is free to move downwardly past the lip 29.

The food supporting portion 22 of the receptacle 15 is provided with a shoulder 36 having a rearwardly extending lip 37 adapted to engage a corresponding groove 38 in the rear wall of cover member 23. The food supporting portion 22 is provided at its forward end with a shoulder 39 having a recess 40 for the reception of a spring-biased ball snap 41 of well known construction. A projection 42 serves as a handle to release the lower member 22 from the cover member 23.

In order to supply heat to the interior of the receptacle 15 in order to maintain the interior temperature of receptacle 15 above the temperature of the refrigerated compartment 11, I have provided a heating coil 16 preferably embedded in the walls of the receptacle 15 adjacent the inner surface thereof. The heating coil 16 in the embodiment shown in Figs. 1 to 3 has portions associated with each vertical side wall of receptacle 15 and is joined at either end thereof to terminals 44 embedded in the receptacle wall and extending outwardly from the lip 32 for engagement with resilient contacts 45 extending from the horizontal portion 28 of the mounting bracket 24. The contacts or terminal members 28 are suitably connected in an electric circuit by means of conductors 46 the complete electric circuit not being shown. The receptacle 15 tends by reason of its own weight to rotate in a counterclockwise direction, as shown in Fig. 2, thereby urging contacts 44 into engagement with contacts 45.

When the receptacle 15 is removed from the mounting bracket 24 the contacts 45 are alive but, due to the location thereof within the recess 33, the contacts 45 are relatively inaccessible and there is practically no danger of accidental contact therewith and shock to the user of the refrigerator. The supply of current to the heating coil 16 may be thermostatically controlled, if desired, and a switch may also be inserted in the electrical circuit if desired.

In the modification disclosed in Fig. 4 I have illustrated a food supporting member 22' of a type adapted to rest on a support, as a shelf, for example. The inside surface of the receptacle is provided with laterally and inwardly extending partition 48, so that when a package of butter or the like is placed within the receptacle 15, the fin or rib 17 carried on the partition 48 engages the sides of the package, thereby dividing the interior of the casing of the receptacle 15 into two sealed chambers 18 and 19 as previously described.

In order to maintain the temperature within the temperature chamber 19 within a range suitable for butter preservation, I have provided an electric heater 16' in the base portion 22' of the receptacle 15, the heater 16' being connected to terminals 44' of the plug-in type, the terminals being adapted for insertion into a suitable plug 50 in a wall of the refrigerator 10, the plug 50 being a component part of a suitable electric circuit.

As illustrated in Fig. 4 the wall portions 20 are comparatively thin so that even though the material from which the receptacle 15 is formed is a relatively poor heat conductor, the transfer of heat between the chamber 18 and the compartment 11 will be relatively unimpeded, whereas the transfer of heat from the high temperature chamber 19 to the compartment 11 will be relatively impeded by the relatively thick wall portion 21. Inasmuch as the rib 17 provides a seal between chambers 18 and 19 at the point of engagement with the foods placed within the receptacle 15 under the conditions previously described, there will be no substantial transfer of heat between chambers 18 and 19. It will be apparent that the sealing arrangement illustrated in Fig. 4 is equally applicable to a food storage receptacle employing the means of support illustrated in Figs. 1 to 3. The rib 17 may be separable from the receptacle 15, if desired, and may comprise a resilient material, as rubber, for example.

While I have described a specific embodiment of my invention in connection with a domestic refrigerator, I do not desire my invention to be limited to the particular construction shown and described, and I intend in the appended claims to cover all modifications within the spirit and scope of my invention.

What I claim as new and desire to secure by Letters Patent of the United States is:

1. In a refrigerator having a refrigerated compartment, a food storage receptacle, and means for supporting said receptacle in said compartment, said means including a first mounting member supported by a wall of said compartment, said member having a recess in a wall thereof, a second mounting member associated with said receptacle and extending into said recess in said first member, the weight of said receptacle and contents therein urging said second member into said recess.

2. In a refrigerator having a refrigerated compartment, a food storage receptacle, and means for supporting said receptacle in said compartment, said means including a first mounting member supported by a wall of said compartment, said member having a recess in a wall thereof, a second mounting member associated with said receptacle and extending into said recess in said first member, means for maintaining the interior of said receptacle at a temperature suitable for the storage of butter in spreadable condition, said means including an electric heating element, a first pair of contacts associated with said second member and connected to said element, a second pair of contacts extending from said first member into said recess, an electric circuit associated with said second pair of contacts, said pairs of contacts being so arranged that the weight of said receptacle urges said first pair of contacts into engagement with said second pair of contacts for establishing an electric circuit for said element.

3. In a refrigerator having a refrigerated compartment, a food storage receptacle in said compartment, electric heating means for maintaining a portion of the interior of said receptacle at a temperature sufficient to preserve butter or the like in a spreadable condition, said means including a pair of terminals extending exteriorly with respect to said receptacle, a mounting member associated with a wall of said compartment, a second pair of terminals associated with said member, said second pair of terminals being connected in an electric circuit, said member and said receptacle being so arranged that the weight of said receptacle urges said terminals into electrical contact with said second pair of terminals.

4. In a refrigerator having a refrigerated compartment and a food storage receptacle therein, means for supporting said receptacle including a mounting bracket supported by a wall of said compartment and having vertically and horizontally extending portions, said horizontal portion having a downwardly and laterally extending lip, said lip cooperating with said portions to provide a recess in a surface of said bracket, a mounting projection on said receptacle extending into said recess in the assembled position of said receptacle and bracket, said projection having a laterally extending lip for interlocking engagement with said first mentioned lip, said vertical portion having a bearing surface for engagement with a wall of said receptacle, said mounting projection being so disposed with relation to said receptacle that the weight of said receptacle urges said lips into overlapping relationship and said receptacle against said bearing surface.

5. In a refrigerator having a refrigerated compartment, a butter receptacle having a casing formed of relatively poor heat conducting material, the inner surface of said casing being provided with a lateral and inwardly extending rib for engaging a package of food placed within said casing, said rib serving to divide the interior of said casing into two chambers when the package of food stored within said casing is of a size substantially to engage said rib, the thickness of said casing being relatively so proportioned as to permit a greater exchange of heat between one of said chambers and said refrigerated compartment than between the other of said chambers and said refrigerated compartment.

6. In a refrigerator having a refrigerated compartment, a butter receptacle having a casing formed of relatively poor heat conducting material, the inner surface of said casing being provided with a laterally and inwardly extending rib for engaging a package of food placed within said casing, said rib serving to divide the interior of said casing into two chambers when the package of food stored within said casing is of a size substantially to engage said rib, the thickness of said casing being relatively so proportioned as to permit a greater exchange of heat between one of said chambers and said refrigerated compartment than between the other of said chambers and said refrigerated compartment, and means for maintaining the temperature within said other chamber above the temperature of said one of said chambers.

7. In a refrigerator having a refrigerated compartment, a butter receptacle comprising a casing constructed and arranged for cooperation with a package of food to provide a substantially closed chamber for at least a portion of said package when associated with said casing, and means for imparting heat to the interior of said chamber whereby the portion of said package within said chamber may be maintained at a temperature above that of the refrigerated compartment.

8. In a refrigerator having a refrigerated compartment, a butter receptacle having a thermally insulative casing, said casing constructed and arranged for cooperation with a package of food to provide a substantially closed chamber for at least a portion of the package when associated with the casing, and means for imparting heat to the interior of said chamber whereby the food therein may be maintained at a temperature above that of the refrigerated compartment.

9. In a refrigerator having a refrigerated compartment, a butter receptacle having a casing having walls of heat insulating characteristics, said casing constructed and arranged with an inwardly directed portion for engagement with the surfaces of a package of food in order to provide a substantially closed chamber for at least a portion of the package when inserted in said casing, and means for imparting heat to the interior of the chamber whereby the food in the chamber may be maintained at a temperature above that of the refrigerated compartment.

WILLIAM P. DODGE.